W. D. BIXLER.
EGG TESTER.
APPLICATION FILED MAY 13, 1912.
1,042,191.
Patented Oct. 22, 1912.
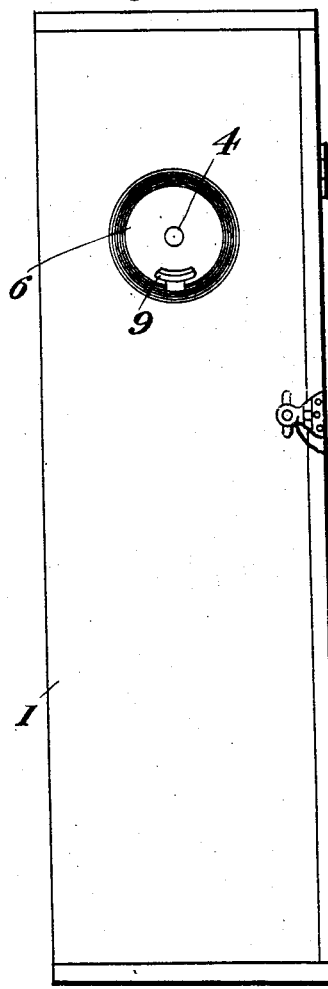
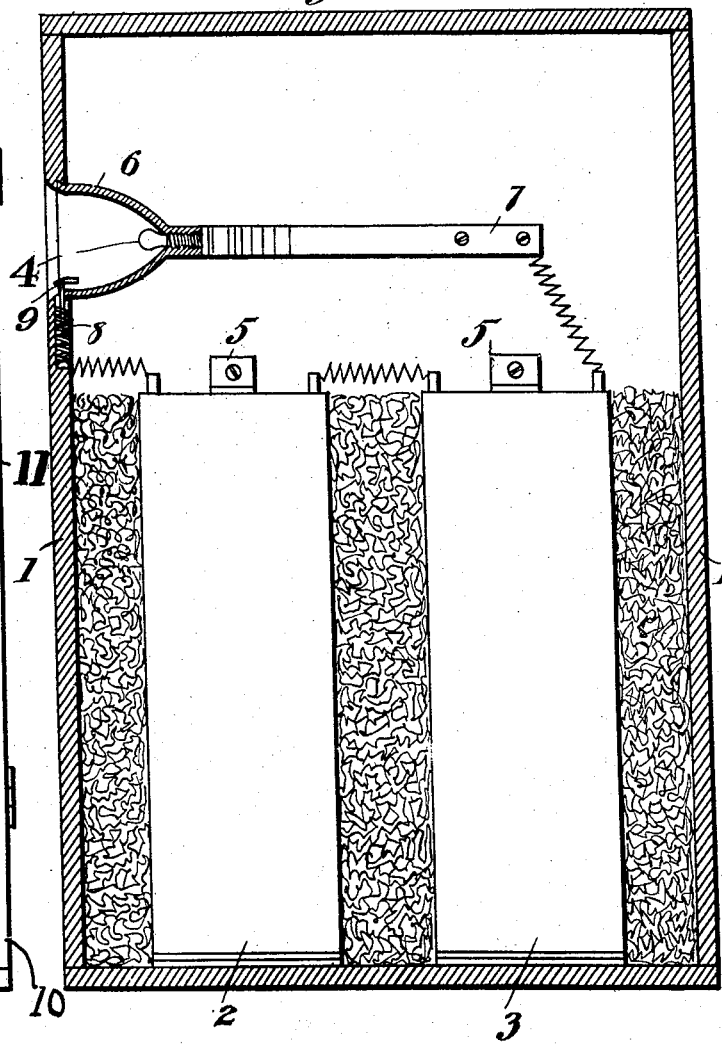
Witnesses
L. T. Knight
Inventor,
W. D. Bixler,
By A. L. Jackson
Attorney

UNITED STATES PATENT OFFICE.

WILLIAM D. BIXLER, OF FORT WORTH, TEXAS, ASSIGNOR OF ONE-HALF TO WILLIAM SCHMIDT, OF FORT WORTH, TEXAS.

EGG-TESTER.

1,042,191. Specification of Letters Patent. Patented Oct. 22, 1912.

Application filed May 13, 1912. Serial No. 696,922.

*To all whom it may concern:*

Be it known that I, WILLIAM D. BIXLER, a citizen of the United States, residing at Fort Worth, in the county of Tarrant and State of Texas, have invented certain new and useful Improvements in Egg-Testers, of which the following is a specification.

My invention relates to egg-testers, and the object is to provide a simple device by which eggs can be practically tested at great speed and which is portable and always ready for use.

The invention is particularly useful for carrying on vehicles and otherwise. The eggs are tested by electric light which is furnished automatically as the egg is put in place for testing and only one hand is required for testing the egg. Consequently both hands can be used in testing the eggs.

The device is so simple and inexpensive that users of eggs as well as egg chandlers can afford to keep such tester.

The device can be used either with current of electricity furnished from some source of power or it can be equipped with a battery for furnishing the electricity.

Other objects and advantages will be fully explained in the following description and the invention will be more particularly pointed out in the claims.

Reference is had to the accompanying drawings which form a part of this application.

Figure 1 is a front elevation and Fig. 2 is a vertical section of the tester.

The tester is provided with a small or large rectangular case 1 which is provided with a door 10 and suitable fastening devices 11. The door is for convenience in adjusting cells 2 and 3 for making a battery. The cells may be held in place by blocks 5 attached to the inside of the casing. A semi-elliptical reflector 6 is attached to the interior of the casing opposite an opening through the front of the casing. The reflector 6 should be of such contour that it will receive the end of an egg. The reflector terminates with a socket for receiving an incandescent electric lamp 4. The reflector is of metal or some conducting material. A spring contact 7 rests against the end of the metal socket and is attached to the interior of the casing. The cells 2 and 3 are electrically connected by a suitable wire. The cell 2 is electrically connected to a spring 8 and a contact 9 is connected to the spring 8. The cell 3 is electrically connected to the spring contact 7 by a suitable wire. By reason of the connection of the contact 9 with the spring 8, the contact 9 is yielding and when the end of an egg is placed in the reflector 6, the contact 9 will be pressed down against the reflector 6 and thus closes a circuit so that the egg can be tested. Packing may be placed about the cells to hold the same in place.

It is apparent that the current for the light may be furnished from other sources than from the cells shown in the casing. It is also apparent that the means for testing eggs can be duplicated in the same casing without departing from my invention.

What I claim, is,—

1. An egg testing device comprising a casing, a battery housed in said casing, a reflector mounted within said casing, said casing having an opening into said reflector, means for connecting said reflector with one pole of said battery, a spring contact connected to the other pole of said battery and standing in the path of eggs to be inserted in said reflector and adapted to be brought into contact with said reflector whenever an egg is inserted in said reflector, and an electric lamp in said reflector connected in said circuit.

2. An egg tester comprising a casing having an opening thereinto, a metallic reflector mounted in said casing around said opening, an electric circuit connected with said reflector, a spring contact connected to the other arm of said circuit and standing in the path of eggs to be inserted in said reflector and adapted to be pressed against said reflector when an egg is thrust into said reflector, and an incandescent globe in said reflector included in said circuit.

3. An egg testing device comprising a reflector of conducting material and adapted to receive the end of an egg, an electric circuit, one arm of which is connected to said reflector, a spring contact connected to the other arm of said circuit and standing in the path of eggs to be inserted in said reflector and adapted to be pressed against said reflector by an egg when thrust into said reflector for closing the circuit, and an incandescent lamp mounted in said reflector and connected in said circuit.

In testimony whereof, I set my hand in the presence of two witnesses, this 3rd day of May, 1912.

WILLIAM D. BIXLER.

Witnesses:
A. L. JACKSON,
J. W. STITT.